US007652859B2

(12) United States Patent
Finney

(10) Patent No.: US 7,652,859 B2
(45) Date of Patent: Jan. 26, 2010

(54) INTELLIGENT ELECTRONIC DEVICE WITH INTEGRATED PUSHBUTTON FOR USE IN POWER SUBSTATION

(75) Inventor: Dale Finney, Oshawa (CA)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 11/617,088

(22) Filed: Dec. 28, 2006

(65) Prior Publication Data

US 2008/0158764 A1 Jul. 3, 2008

(51) Int. Cl.

| | |
|---|---|
| ***H02H 3/00*** | (2006.01) |
| *H01H 47/00* | (2006.01) |
| *H01H 47/18* | (2006.01) |
| *H01H 47/32* | (2006.01) |
| *H01H 47/26* | (2006.01) |
| *H01H 50/12* | (2006.01) |
| *H01H 9/00* | (2006.01) |

(52) U.S. Cl. ......................... 361/78; 361/191; 361/196; 361/205; 361/206

(58) Field of Classification Search .................. 361/78, 361/191, 196, 205, 206

See application file for complete search history.

(56) References Cited

U.S. PATENT DOCUMENTS 3,491,218 A * 1/1970 Robbins ..................... 200/457
4,191,066 A * 3/1980 Keranen ...................... 74/527
4,609,984 A * 9/1986 Strosser et al. ................. 700/1
5,289,148 A * 2/1994 Siglock et al. .............. 335/202
5,578,802 A * 11/1996 Palmowski ................. 200/5 A

OTHER PUBLICATIONS

"Moderizing Your Substation? Visual Substation—designed for the power industry", cybectec, www.cybectec.com, hhtp://www.cybectec.com/en/pdf/Visual_Substation_flyer.pdf, Feb. 10, 2007.
"GE Energy Announces Its D400 Substation Data Manager", Feb. 7, 2006, Tampa, FL., http" //news.thomasnet.com/printready.html?prid=476237.
ANSI INCITS 359-2004 Information technolojy—Role Based Access Control Available from: http://webstore.ansi.org/ansidocstore/product.asp?sku=ANSI+INCITS+359%2D2004.
U.S. Appl. No. 11/617,048, filed Dec. 28, 2006.
U.S. Appl. No. 11/617,050, filed Dec. 28, 2006.

* cited by examiner

*Primary Examiner*—Fritz M. Fleming
*Assistant Examiner*—Lucy Thomas
(74) *Attorney, Agent, or Firm*—GE Global Patent Operation; Roger C. Phillips; William J. Fitzpatrick

(57) ABSTRACT

The present disclosure describes a new pushbutton incorporated into new circuit configurations of an improved intelligent electronic device ("IED"), for use in power substation control systems. The new pushbutton is non-mechanical and configured to control a breaker, or other type of substation equipment, after an IED associated with the circuit breaker, or other type of substation equipment, fails to operate. In an embodiment, the new pushbutton may be a low-energy, membrane-type pushbutton. During normal operation, a microprocessor within the IED operates a solid-state device to control the operation of substation equipment. When the IED fails, manually depressing the new pushbutton bypasses the IED microprocessor and manually controls the substation equipment associated with the failed IED.

19 Claims, 4 Drawing Sheets

INTELLIGENT ELECTRONIC DEVICE WITH INTEGRATED PUSHBUTTON FOR USE IN POWER SUBSTATION

BACKGROUND

1. Field of the Invention

The present disclosure relates to power substations generally, and more particularly, to a new pushbutton incorporated into new circuit configurations of an improved intelligent electronic device ("IED") for use in power substation control systems.

2. Discussion of Related Art

Power substations include primary equipment, such as transformers, capacitor banks, and generators; and secondary equipment, such as cables, switches, relays, protective equipment, and control equipment. Primary equipment is located in the substation yard and controlled via (fiber-optic and/or metallic) cables. Providing all weather protection and security for the control equipment, a substation control house contains switchboard panels, batteries, battery chargers, supervisory control equipment, power-line carriers, meters, and relays. Located within the control house, the switchboard control panels contain meters, control switches, and recorders used to control the substation equipment, to send power from one circuit to another, or to open or close circuits when needed.

In the past, hundreds of discrete electromechanical and/or solid-state control devices were needed to monitor and manage the operation of a single substation's primary equipment. Recently, microprocessor-based devices, called intelligent electronic devices ("IEDs"), have become popular, not only because a single IED can be programmed and configured to monitor and manage a variety of substation equipment, but also because new substations constructed using IEDs cost less to construct than substations constructed using electromechanical and/or solid-state control devices. Properly positioned and configured, an IED can receive and relay status signals from primary equipment to a master computer located in the control house. Additionally, an IED can receive and relay command signals from the master computer to the primary equipment. The large majority of substation functions have been merged into the IED. However, local control of substation equipment remains problematic. This is due to the fact that the IED is necessarily more complex and therefore has a lower reliability that the simple mechanical pushbutton it replaces.

Problems arise when an IED fails, since transmission of status signals from its associated primary equipment and transmission of control signals from the master computer to the associated primary equipment stop. Manufactured to interrupt heavy power loads, mechanical pushbuttons tend to be heavy and bulky. A mechanical pushbutton is known to have been directly and externally connected to the input/output terminals of an IED. Such a configuration is problematic on several levels. Not only is the mechanical pushbutton a significant proportion of the size of the IED itself, but also the mechanical pushbutton is capable of interrupting thirty or more amps of current. Such a pushbutton is too large and cumbersome to be easily incorporated into an IED.

What is needed is a new, non-mechanical, pushbutton that easily integrates within an IED, handles only a small amount of current (e.g., less than one amp), and is configured to control substation equipment if the IED fails.

BRIEF DESCRIPTION

The present disclosure describes a new pushbutton incorporated into new circuit configurations of an improved intelligent electronic device ("IED") for use in power substation control systems. In an embodiment, the pushbutton is failsafe. It may also be configured to prevent its accidental or unauthorized activation. The new pushbutton is non-mechanical and configured to control a circuit breaker, or other type of substation equipment, after an IED associated with the circuit breaker, or other type of substation equipment, malfunctions. In an embodiment, the new pushbutton may be a low-energy, membrane-type pushbutton. During normal operation, a microprocessor within the IED operates a solid-state device to control the operation of substation equipment. When the IED malfunctions, the new pushbutton can be manually operated to bypass a relay normally controlled by the IED microprocessor. In this manner, the substation equipment associated with the failed IED can be manually operated. Since the new pushbutton utilizes a solid-state output device and handles a small amount of current, it would not be viable if simply connected with the output terminals of a conventional IED. In an embodiment, a solid-state switch is a non-limiting example of a solid-state device.

Advantages afforded by embodiments of the new pushbutton are: that it is smaller than a mechanical pushbutton; that it is easily integrated as part of an IED, rather than being externally affixed thereto; that it provides a high availability (meaning the pushbutton can be activated even if the IED into which it is incorporated fails); and that it carries less than an amp of current. Since the new pushbutton does not need to directly interrupt significant amounts of current flowing to substation equipment, it can be inexpensively manufactured and procured.

In an embodiment, an improved intelligent electronic device for controlling power substation equipment includes a microprocessor, a pushbutton, and a solid-state device. The solid-state device is coupled with the microprocessor, the pushbutton, and an output terminal of the intelligent electronic device. The solid-state device is further configured to be operated by the pushbutton when the microprocessor fails to operate.

In another embodiment, an apparatus includes a microprocessor, an input terminal, an output terminal, a pair of spaced-apart button contacts (one of which is coupled with the input terminal), a solid-state device, a first relay, a second relay, and a pushbutton. The solid-state device is electrically coupled with the first and second relays and with the output terminal. The first relay is coupled between the input terminal and a gate of the solid-state device. Additionally, the first relay is configured to be open unless closed by the microprocessor. The second relay is coupled between the gate of the solid-state device and a second of the pair of spaced-apart button contacts. Additionally, the second relay is configured to be closed unless opened by the microprocessor. The pushbutton is configured to electrically contact the pair of spaced-apart button contacts.

Other features and advantages of the disclosure will become apparent by reference to the following description taken in connection with the accompanying drawings.

BRIEF DESCRIPTION OF THE DRAWINGS

For a more complete understanding of the new pushbutton incorporated into new circuit configurations of an improved intelligent electronic device ("IED"), and the advantages thereof, reference is now made to the following descriptions taken in conjunction with the accompanying drawings, in which.

Like reference characters designate identical or corresponding components and units throughout the several views.

DETAILED DESCRIPTION

Figure 1:
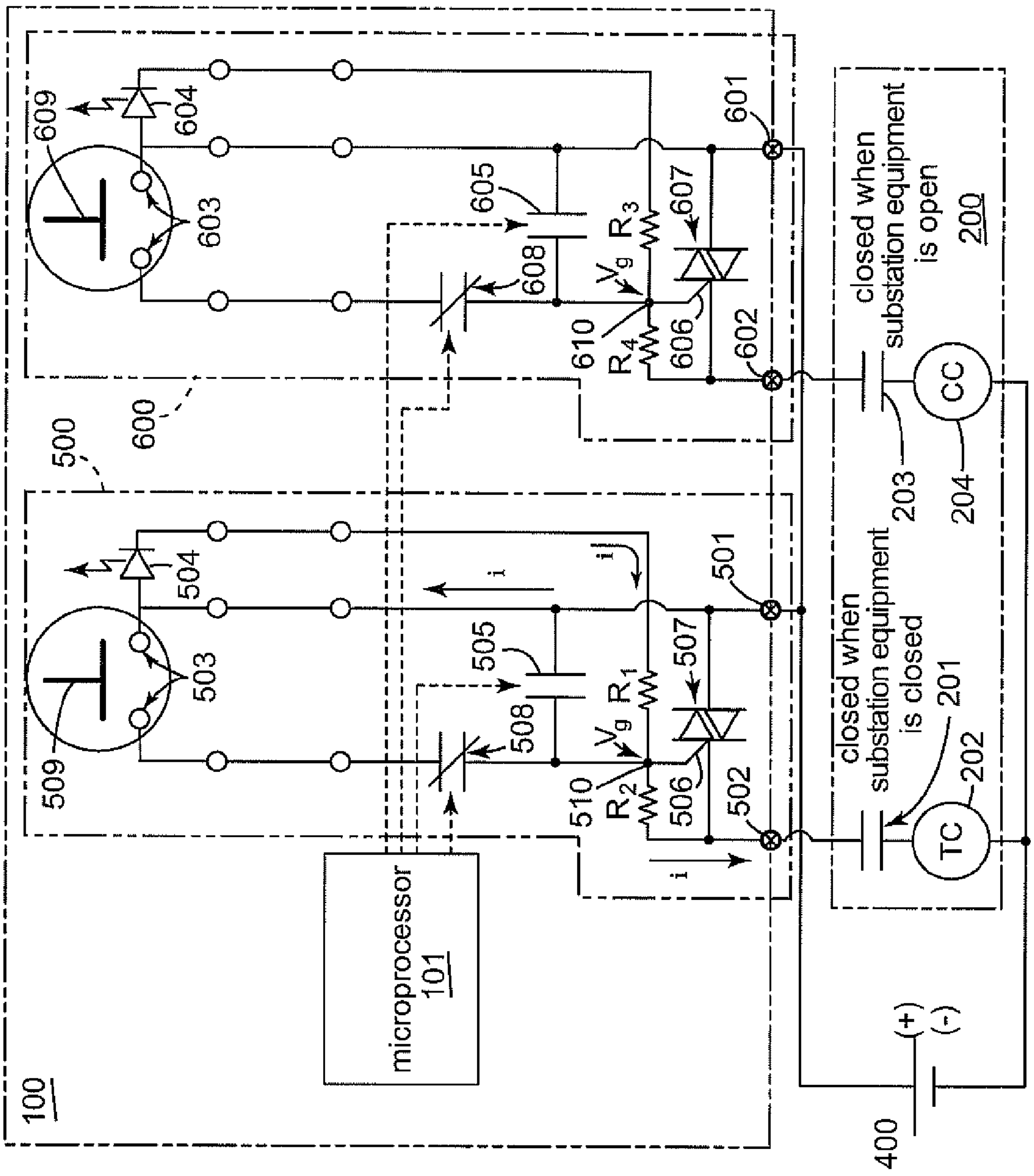
FIG. 1 is a schematic of illustrating an embodiment of internal circuitry of an intelligent electronic device ("IED")

FIG. 1 is a schematic of an embodiment of an improved intelligent electronic device ("IED") 100 having at least one new pushbutton 509 and/or 609 integrated therein. Small, inexpensive, and low-energy, the new pushbuttons 509,609 carry only small amounts of current, provide high availability, are reliable, and are easily operated. The new pushbuttons 509,609 and the circuit(s) 500,600 to which they are connected are means for manually operating power equipment when a microprocessor 101 within the IED 100 malfunctions.

An improved IED 100 that integrates new pushbuttons 509,609 can be used in any suitable application, a non-limiting example of which is an electrical power substation. Illustratively, an improved IED configured to monitor and/or control substation primary and/or secondary equipment may be installed within a power substation control house. A non-limiting example of substation equipment that may be monitored and/or controlled by an IED is a circuit breaker. Of course, embodiments of the improved IED may be configured to monitor and/or control other types of power equipment, and may be installed in other types of indoor and/or outdoor locations.

Referring to FIG. 1, an embodiment of an improved IED 100 includes a microprocessor 101, a first circuit 500, a second circuit 600, input terminals 501,601, and output terminals 502,602. The microprocessor is configured to control the current flow and voltage levels in the first circuit 500 and in the second circuit 600. The first circuit 500 controls an opening of a circuit breaker, a motor-operated switch, or other type of substation equipment. The second circuit 600 controls a closing of the circuit breaker, the motor-operated switch, or other type of substation equipment. In FIG. 1 (and also in FIGS. 2 and 3), opposing parallel lines generally depict a normally open switch. Opposing parallel lines through which a sloping line is drawn generally depict a normally closed switch.

Referring again to FIG. 1, a power source 400 connected to the IED input terminals 501, 601 provides current necessary to operate the IED. The power source 400 may be one or more power substation batteries, one or more fuel cells, a generator, and the like that are capable of producing power in the illustrative range of about 125 Volts to about 250 Volts DC. Substation equipment 200 that will be monitored and/or controlled by the improved IED 100 is connected to the IED output terminals 502,602. The substation equipment 200 includes first switch 201 that connects to the IED output terminal 501. The first switch 201 is closed when the substation equipment 200 is closed, and opens when the substation equipment 200 is open. A trip coil 202 connected between the first switch and the power source 400 trips (e.g., throws open) a circuit breaker (not shown) when a voltage received from the IED 100 across the output terminal 501 and the first switch 201 exceeds a predetermined threshold trip voltage.

The substation equipment 200 further includes a second switch 203 that connects to the IED output terminal 602. The second switch 203 is closed when the substation equipment is open, and opens when the substation equipment is closed. A close coil 204 connected between the second switch 203 and the power source 400 closes the circuit breaker (not shown) when a voltage received from the IED 100 across the output terminal 602 and the second switch 203 exceeds a predetermined threshold close voltage. At any given time, at least one of the first switch 201 and the second switch 203 will be open.

As mentioned above, the IED 100 includes two circuits 500,600. These circuits 500,600 may have identical components and configurations. Illustratively, the circuit 500 includes an input terminal 501, an output terminal 502, pair of spaced-apart button contacts 503, an LED 504, a first relay 505, a solid-state device gate 506, a solid-state device 507, a second relay 508, a new pushbutton 509, a first resistor R1, a second resistor R2, and a node 510 between the resistors R1 and R2 to which the first and second relays 505, 508 are electrically coupled. The values of R1 and R2 are chosen so that an appropriate, predetermined gate voltage Vg is produced at the node 510, and applied to the gate 506 of the solid-state device 507.

Similarly, the circuit 600 includes an input terminal 601, an output terminal 602, pair of spaced-apart button contacts 603, an LED 604, a first relay 605, a solid-state device gate 606, a solid-state device 507, a second relay 608, a new pushbutton 609, a first resistor R3, a second resistor R4, and a node 610 between the resistors R3 and R4 to which the first and second relays 605, 608 are electrically coupled. The values of R3 and R4 are chosen so that an appropriate, predetermined gate voltage Vg is produced at the node 610, and applied to the gate 606 of the solid-state device 607.

The IED microprocessor 101 is coupled with relays 505 and 508 in circuit 500, and with relays 605 and 608 in circuit 600. When the new pushbutton 509 and the new pushbutton 609 are both in a first unpushed position, the microprocessor 101 holds relays 505, 605 closed and holds the relays 508,608 open. If the microprocessor fails, the relays 505,605 default to open positions, and the relays 508,608 default to closed positions. Additionally, during normal operation, the microprocessor operates the solid-state devices 507, 607 by opening and closing the relays 505,605, respectively. In an embodiment, each of the solid-state devices 507,607 may be a triac.

Referring to FIG. 1, illustrative current paths in the circuit 500 are described. Power source 400 provides current i, which enters the circuit 500 via the input terminal 501. From the input terminal 501, the current flows through and illuminates the LED 504, provided relay 505 is open. After leaving the LED 504, the current flows through the series of resistors R1 and R2, and then exits the circuit 500 via the output terminal 502.

A different current path arises when the microprocessor 101 closes the relay 505. In this situation, at time T1, the current enters the circuit 500 via the input terminal 501. From the input terminal 501, the current flows across the closed relay 505 and to a node positioned between the series resistors R1 and R2. R1 will typically be 500 to 1000 times larger than R2, allowing the LED to provide indication but preventing the LED current from turning-on the device. A person of ordinary skill in the art will appreciate that the actual resistance values of R1 and R2 will vary depending on the type of solid-state device 507 used. Accordingly, the resistance values of R1 and R2 should be selected to generate the particular value of gate voltage Vg required to operate the solid-state device 507. Some current flows through the resistor R2 and exits the circuit 500 via the output terminal 502. The current flowing through the resistor R2 creates the gate voltage Vg at the node 510 positioned between the series resistors R1 and R2. At time T2, the applied gate voltage activates the solid-state device 507 so that the resistance of the switch becomes essentially zero. This causes the bulk of the current thereafter entering the circuit 500 via the input terminal 501 flows across the solid-state device 507. The circuit comprised of the resistors R1,R2 provides a signal at the level required to allow the button 509 to turn-on the solid-state switch and to allow the LED 504 to provide indication of the state of the equipment 200. In effect, this circuit creates a low power source for control of the LED 504 and solid-state switch 507 that is derived from the same source 400 that is controlling the equipment 200. Other embodiments of this circuit are possible.

Although the internal resistance of the solid-state device 507 is less than the resistances of the resistors R1,R2, individually and/or combined, the increased current flow across the solid-state device 507 significantly increases the voltage received at the output terminal 502. When this increased voltage reaches the trip coil 202, the trip coil de-latches the mechanism of the substation equipment 200 causing a change in the state of substation equipment 200. This in turn opens the relay 201. In one embodiment, the substation equipment is a circuit breaker that trips when the trip coil 202 activates in response to receiving the increased voltage described above.

Figure 3:
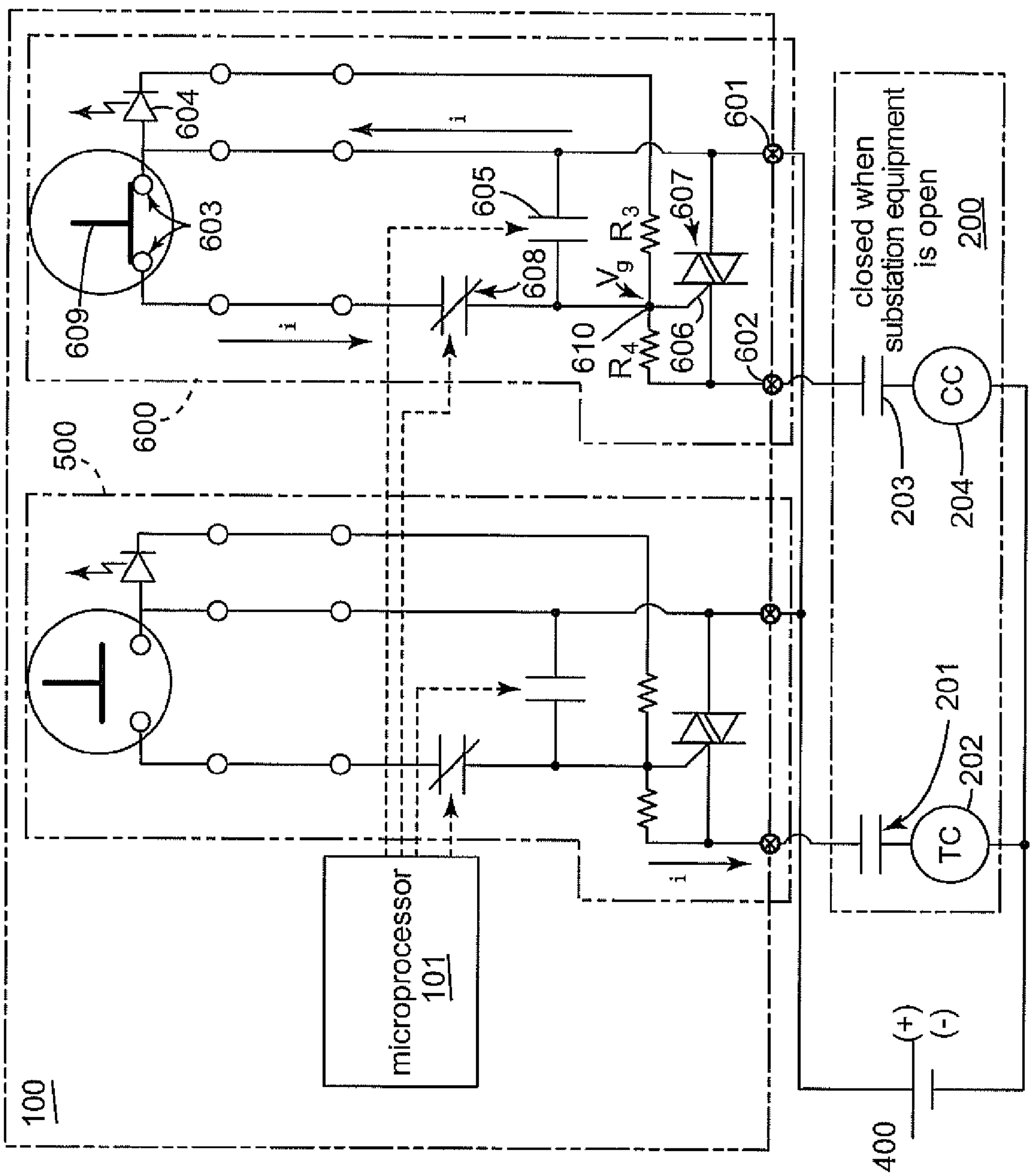
FIG. 3 is another schematic of the new IED circuitry of FIG. 1 illustrating operation of the circuit when the other of the two pushbuttons is manually activated.

Referring to FIGS. 1 and 3, illustrative current paths in the circuit 600 are described. Power source 400 provides current i, which enters the circuit 600 via the input terminal 601. From the input terminal 601, the current flows through and illuminates the LED 604, provided relay 605 is open. After leaving the LED 604, the current flows through the series of resistors R3 and R4, and then exits the circuit 600 via the output terminal 602.

A different current path arises when the microprocessor 101 closes the relay 605. In this situation, at time T1, the current enters the circuit 600 via the input terminal 601. From the input terminal 601, the current flows across the closed relay 605 and to a node positioned between the series resistors R3 and R4. R3 will typically be 500 to 1000 times larger than R4, Allowing the LED to provide indication but preventing the LED current from turning-on the device. A person of ordinary skill in the art will appreciate that the actual resistance values of R3 and R4 will vary depending on the type of solid-state device 607 used. Accordingly, the resistance values of R3 and R4 should be selected to generate the particular value of gate voltage Vg required to operate the solid-state device 607. Some current flows through the resistor R3 and exits the circuit 600 via the output terminal 602. The current flowing through the resistor R2 creates the gate voltage Vg at the node 610 positioned between the series resistors R3 and R4. At time T2, the applied gate voltage activates the solid-state device 607 so that the bulk of the current thereafter entering the circuit 600 via the input terminal 601 flows across the solid-state device 607. Because the internal resistance of the solid-state device 607 is less than the resistances of the resistors R3 and R4, individually and/or in combination, the current flow across the solid-state device 607 significantly increases the voltage received at the output terminal 602. When this increased voltage reaches the close coil 604, the close coil opens the relay 603, causing a change in the operation of the substation equipment 200. In one embodiment, the substation equipment is a circuit breaker that closes when the close coil 604 activates in response to receiving the increased voltage described above.

Figure 2:
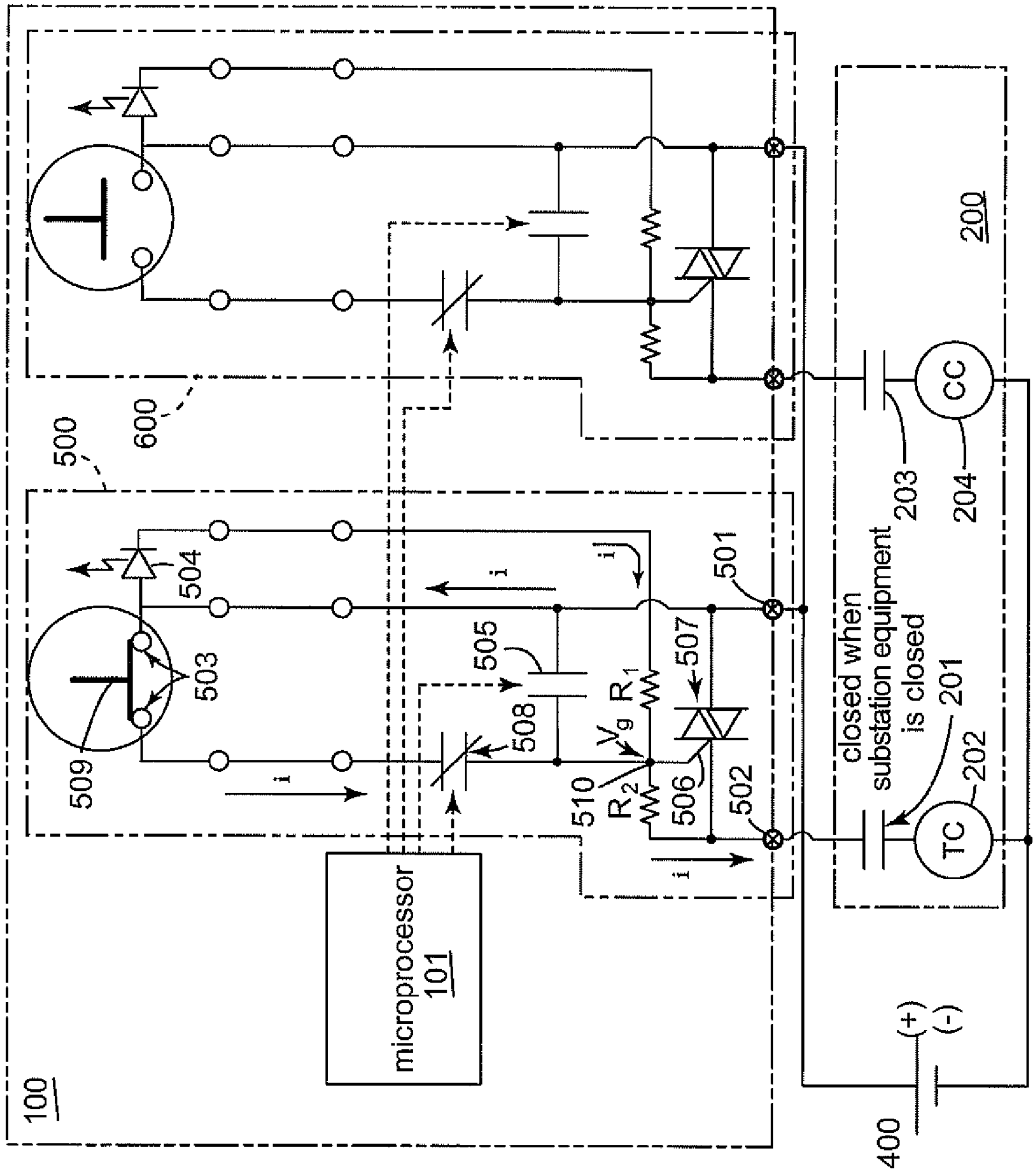
FIG. 2 is another schematic of the new IED circuitry of FIG. 1 illustrating operation of the circuit when one of the two pushbuttons is manually activated.

FIG. 2 reproduces the schematic of FIG. 1, but shows the new pushbutton 509 in a second (pushed-in) position that places a part of the new pushbutton 509 into electrical contact with both of a pair of spaced-apart button contacts 503. When the new pushbutton 509 occupies the second position shown in FIG. 2, a current path is created that bypasses a relay that the microprocessor operates to control the solid-state device. Illustratively, relay 505 is the microprocessor-controlled relay that is bypassed. Referring again to FIG. 2, at least one of the pair of spaced-apart button contacts 503 is coupled with the input terminal 501. If the microprocessor 101 malfunctions, the new pushbutton 509 can be manually pushed to operate the relay 505 within the circuit 500 to cause a change in the operation of the substation equipment 200.

Referring to the circuit 500, when the new pushbutton 509 is depressed to contact the pair of spaced-apart button contacts, 503, current drawn from the power source 400 passes through the input terminal 501, across the new pushbutton 509, and across the closed relay 508 (which defaults to a closed position whenever the microprocessor 101 malfunctions) to reach the node 510 between the resistors R1 and R2. Thereafter, the gate voltage Vg is created at the node 510 to operate the solid-state device 507 and trip the trip coil 202, as described above.

FIG. 3 reproduces the schematic of FIGS. 1 and 2, but shows the new pushbutton 609 in a second (pushed-in) position that places a part of the new pushbutton 609 into electrical contact with both of a pair of spaced-apart button contacts 603. When the new pushbutton 609 occupies the second position shown in FIG. 2, a current path is created that bypasses a relay that the microprocessor operates to control the solid-state device. Illustratively, relay 505 is the microprocessor-controlled relay that is bypassed. Referring again to FIG. 3, at least one of the pair of spaced-apart button contacts 603 is coupled with the input terminal 601. If the microprocessor 101 malfunctions, the new pushbutton 609 can be manually pushed to operate the relay 605 within the circuit 600 to cause a change in the operation of the substation equipment 200.

Referring to the circuit 600, when the new pushbutton 609 is depressed to contact the pair of spaced-apart button contacts 603, current drawn from the power source 400 passes through the input terminal 601, across the new pushbutton 609, and across the closed relay 608 (which defaults to a closed position whenever the microprocessor 101 malfunctions) to reach the node 610 between the resistors R3 and R4. Thereafter, the gate voltage Vg is created at the node 610 to operate the solid-state device 607 and activate the close coil 204, as described above.

Figure 4:
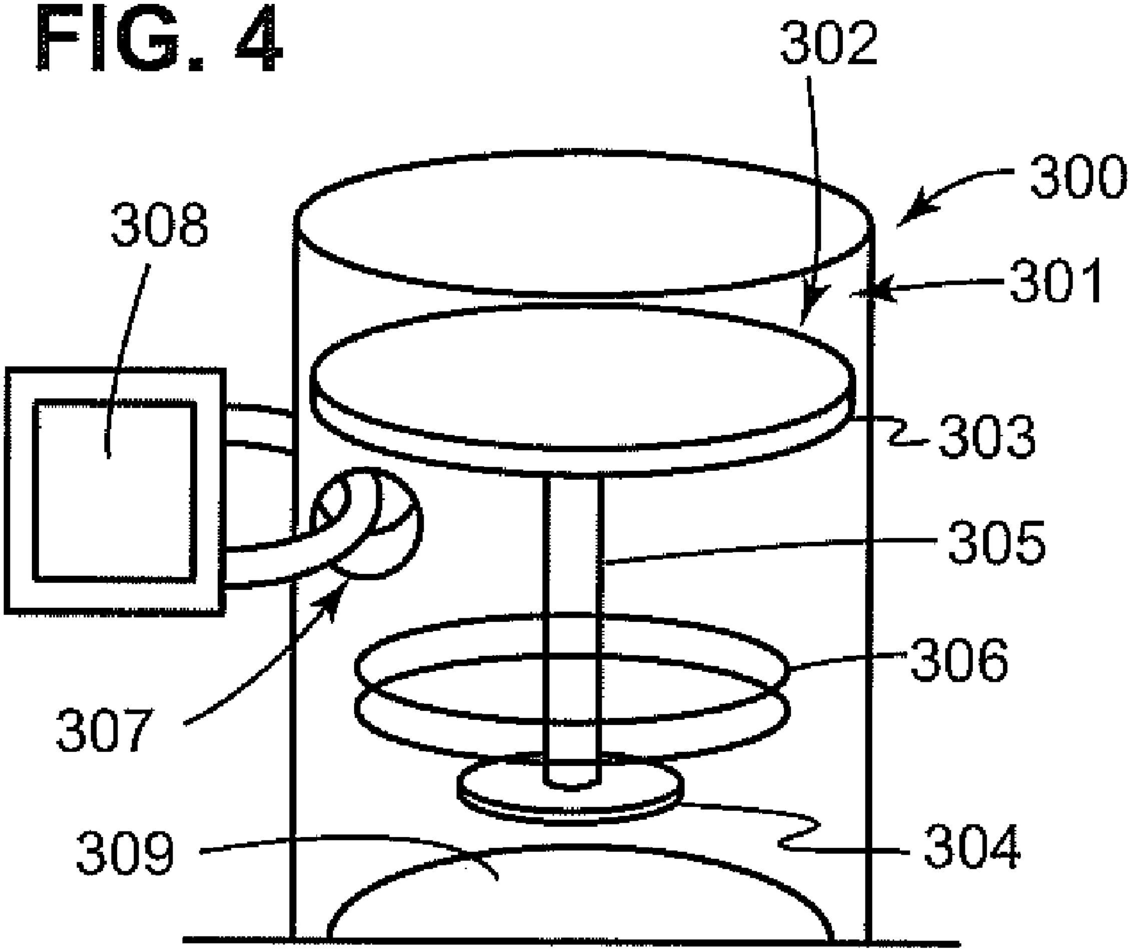
FIG. 4 is an enlarged view of the new pushbuttons shown in FIGS. 1, 2, and 3.

FIG. 4 is an enlarged view of an embodiment of an exemplary new low-energy, membrane pushbutton 300. In FIG. 4, the membrane 309 of the pushbutton 300 is the bubble shape at the bottom of the drawing. Note that the new pushbuttons 509 and 609 shown in FIGS. 1, 2, and 3, may have the identical or similar structure and/or function as the new pushbutton 300.

Thus, a compact, low-energy, low cost pushbutton may be integrated into an IED. As illustratively depicted in FIGS. 1, 2, and 3, the pushbutton 509,609,300 may be of a membrane-type. In alternative embodiments, other types of pushbutton 509, 609, 300 that are simple, reliable, and have good environmental characteristics may be used.

In addition to being a very simple device, embodiments of the new pushbutton 509,609,300 can also constructed to include a locking mechanism. In an embodiment, the locking mechanism is an integrated key switch or a cover that is padlock-able. New pushbutton 300 may be a low-energy, membrane pushbutton having a rigid, semi-rigid, or flexible membrane, and a rigid tube 301 that encloses the membrane pushbutton and that houses a plunger assembly 302. The plunger assembly 302 may include a cylindrical top portion 303, a cylindrical bottom portion 304, and a cylindrical shaft 305 that connects the top portion 303 and the bottom portion 304. The new pushbutton 300 may further include a spring 306 for restoring the plunger assembly 302 to its first (non-depressed) position after the new pushbutton 300 is pushed to a second position and released. In an embodiment, the second position places bottom portion 304 into physical contact with the membrane 309 to convey current from an input terminal 501,601 across the pair of pushbutton contacts 503,603 to the node 510,610 positioned between the series resistors R1,R2; R3,R4, respectively.

Optionally, the new pushbutton 300 may be configured to prevent moving the new pushbutton 300 to the second position. For example, the rigid tube 301 may include a hole 307 extending therethrough. The hole 307 is positioned to prevent the plunger assembly from reaching the second position when an object is inserted within the hole 307. For example, the hole 307 may be positioned between an upper end of the spring 304 and the cylindrical upper portion 302 of the new pushbutton 300. Thus, a hasp of a lock 308, or other object, may be inserted through the hole 307 to prevent the new pushbutton 300 from being pushed until needed.

The components and arrangements of the new pushbutton incorporated into new circuit configurations of an improved intelligent electronic device ("IED"), shown and described herein are illustrative only. Although only a few embodiments of the invention have been described in detail, those skilled in the art who review this disclosure will readily appreciate that substitutions, modifications, changes and omissions may be made in the design, operating conditions and arrangement of the preferred and other exemplary embodiments without departing from the spirit of the embodiments as expressed in the appended claims. Accordingly, the scopes of the appended claims are intended to include all such substitutions, modifications, changes and omissions.

What is claimed is:

1. An intelligent electronic device for controlling equipment, the intelligent electronic device comprising:

a microprocessor;

a pushbutton;

a solid-state device coupled with the microprocessor, the pushbutton, and an output terminal of the intelligent electronic device, a first relay coupled between the input terminal and a gate of the solid-state device, and a second relay coupled between the gate of the solid-state device and the pushbutton;

wherein when the microprocessor fails to operate, the solid-state device is configured to be operated by the pushbutton.

2. The intelligent electronic device of claim 1, wherein control power for operating the solid-state device from the pushbutton is derived from a source that also controls the equipment.

3. The intelligent electronic device of claim 1, wherein the equipment is power substation equipment.

4. The intelligent electronic device of claim 1, wherein the pushbutton is movable between a first position and a second position, the second position creating a current path, that bypasses a relay that the microprocessor operates, to control the solid-state device.

5. The intelligent electronic device of claim 1, wherein the pushbutton comprises:

a plunger assembly;

a rigid tube housing the plunger assembly; and a spring configured to restore the plunger assembly to the first position after the plunger assembly is released from the second position.

6. The intelligent electronic device of claim 5, wherein the pushbutton further comprises:

a membrane coupled with the plunger assembly.

7. The intelligent electronic device of claim 6, wherein the pushbutton further comprises a hole formed therethrough, wherein the hole is positioned to prevent the plunger assembly from reaching the second position when an object is inserted within the hole.

8. The intelligent electronic device of claim 7, wherein the object is a hasp of a lock.

9. The intelligent electronic device of claim 7, wherein the pushbutton is configured to carry less than an amp of current.

10. The intelligent electronic device of claim 1, wherein the pushbutton is integrated as a component of the intelligent electronic device.

11. The intelligent electronic device of claim 1, wherein the output terminal is coupled with a piece of the equipment.

12. The intelligent electronic device of claim 1, wherein the piece of equipment is a circuit breaker or a motor-operated switch.

13. The intelligent electronic device of claim 1, wherein the pushbutton is a low energy, membrane pushbutton.

14. An apparatus, comprising:

a microprocessor;

an input terminal;

an output terminal;

pair of spaced-apart button contacts, wherein one of the button contacts is coupled with the input terminal;

a solid-state device electrically coupled with the output terminal;

a first relay coupled between the input terminal and a gate of the solid-state device, wherein the first relay is configured to be open unless closed by the microprocessor;

a second relay coupled between the gate of the solid-state device and a second of the pair of spaced apart button contacts, wherein the second relay is configured to be closed unless opened by the microprocessor;

and a pushbutton configured to electrically contact the pair of spaced-apart button contacts.

15. The apparatus of claim 14, wherein the pushbutton is movable between a first position and a second position, the second position causing the pushbutton to electrically contact the pair of spaced-apart button contacts and create a current path that bypasses the first relay and causes current from the input terminal to flow across the solid-state device to the output terminal.

16. The apparatus of claim 14, further comprising:

a first resistor;

a light emitting diode coupled between the input terminal and the first resistor;

a second resistor in series with the first resistor, wherein the second resistor is coupled with the output terminal, and wherein each of a gate of the solid state device, the first relay, and the second relay is coupled to a node between the first and second resistors.

17. The apparatus of claim 14, wherein the pushbutton is a low energy, membrane pushbutton.

18. The apparatus of claim 17, wherein the pushbutton is configured to carry less than an amp of current.

19. The apparatus of claim 15, wherein the pushbutton is configured to prevent moving the pushbutton to the second position.

* * * * *

UNITED STATES PATENT AND TRADEMARK OFFICE

CERTIFICATE OF CORRECTION

PATENT NO. : 7,652,859 B2
APPLICATION NO. : 11/617088
DATED : January 26, 2010
INVENTOR(S) : Dale Finney It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this

Twenty-third Day of November, 2010

David J. Kappos
*Director of the United States Patent and Trademark Office*